Figure 5:
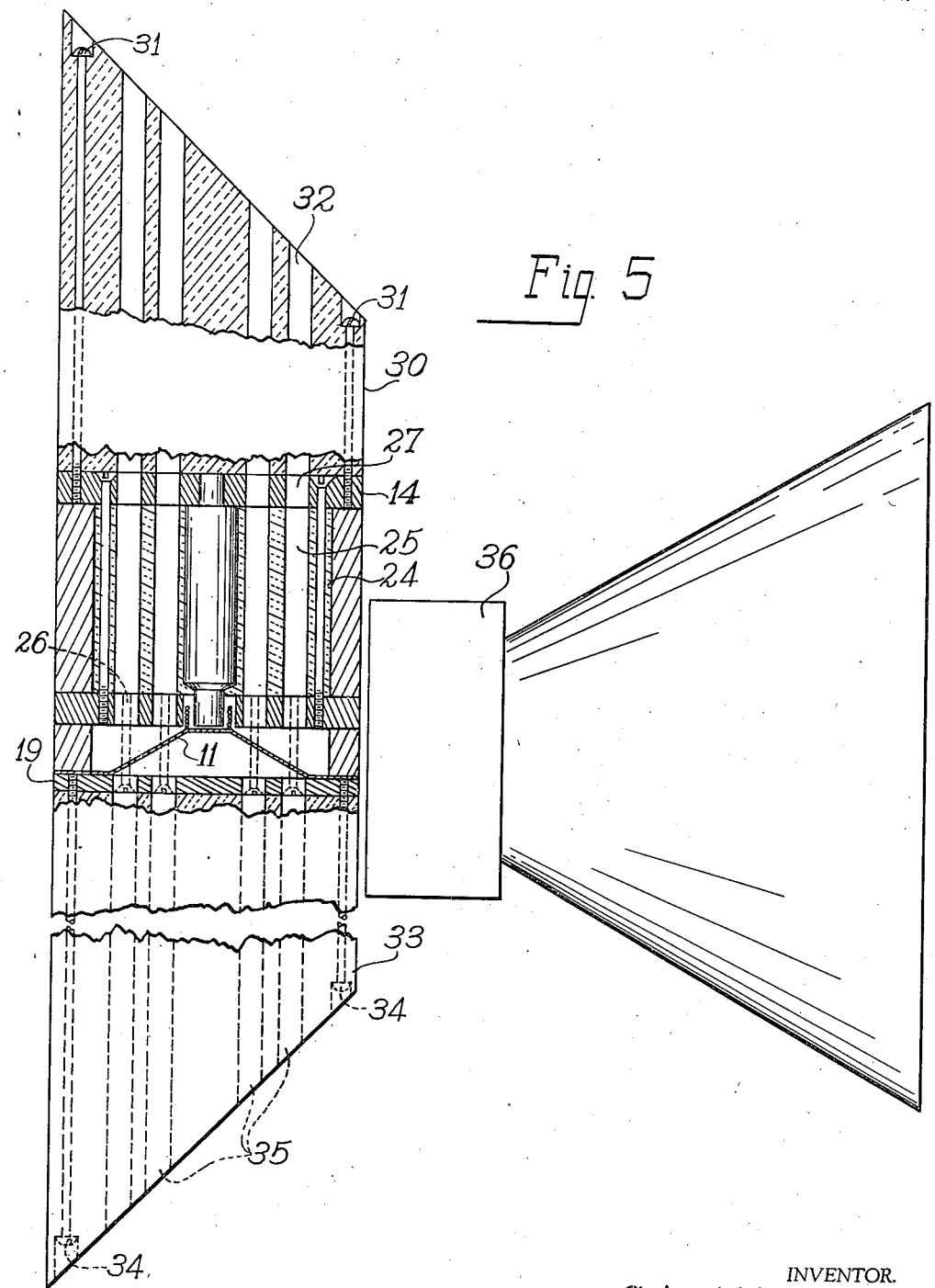

March 8, 1949.　　　　G. M. GIANNINI　　　　2,463,762
ELECTROACOUSTICAL TRANSDUCER
Filed Nov. 14, 1941　　　　　　　　　　　　5 Sheets-Sheet 1
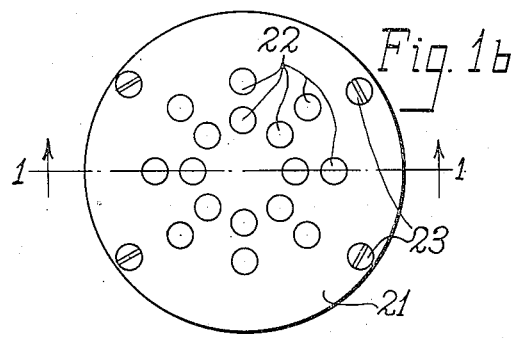
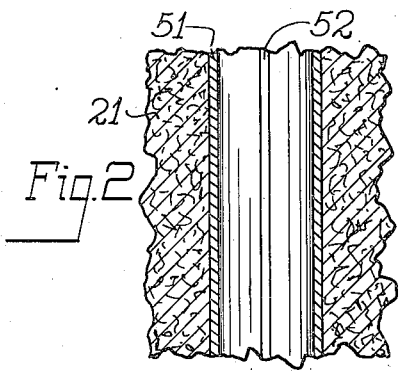
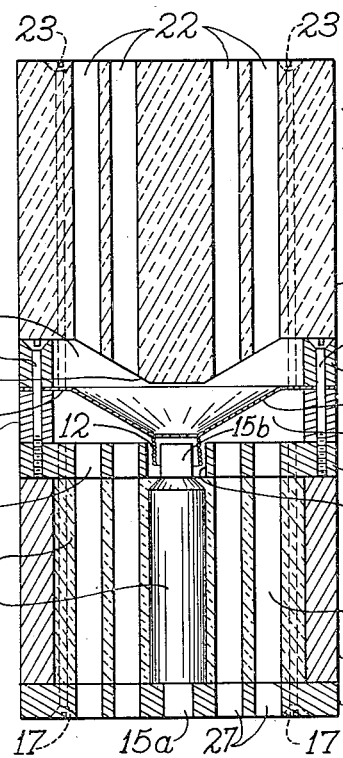
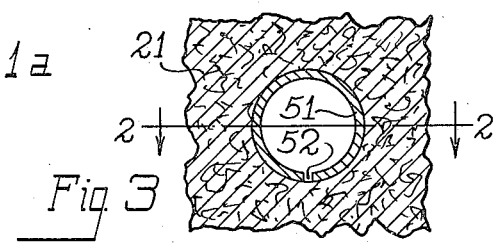
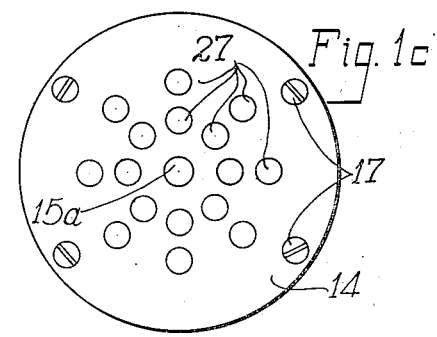
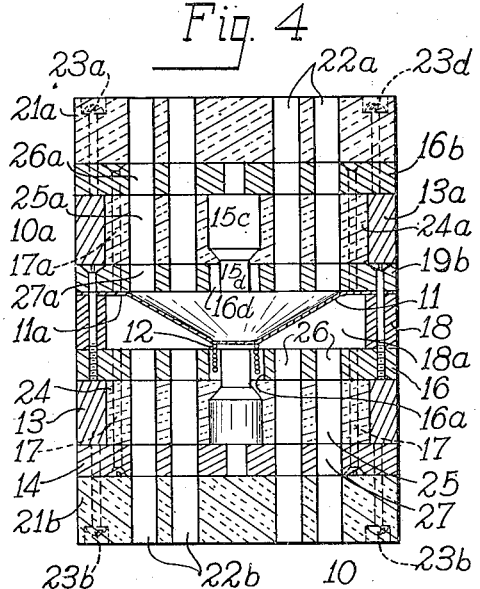
INVENTOR.
Gabriel M. Giannini
BY Davis, Lindsey, Smith & Shonts
Attorneys.

INVENTOR.
Gabriel M. Giannini
BY Davis, Lindsey, Smith & Shonts
Attorneys.

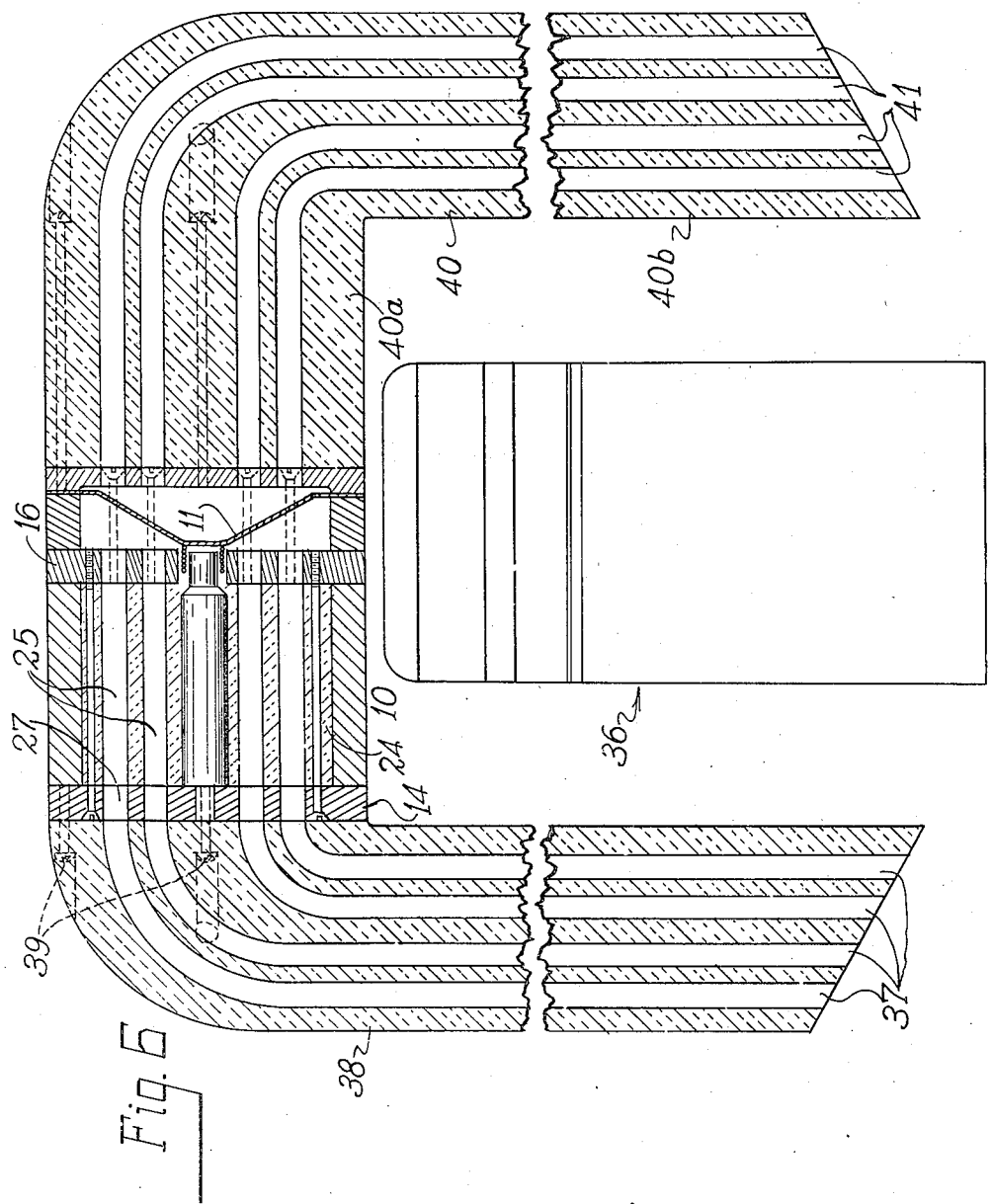

March 8, 1949.    G. M. GIANNINI    2,463,762
ELECTROACOUSTICAL TRANSDUCER
Filed Nov. 14, 1941    5 Sheets-Sheet 4
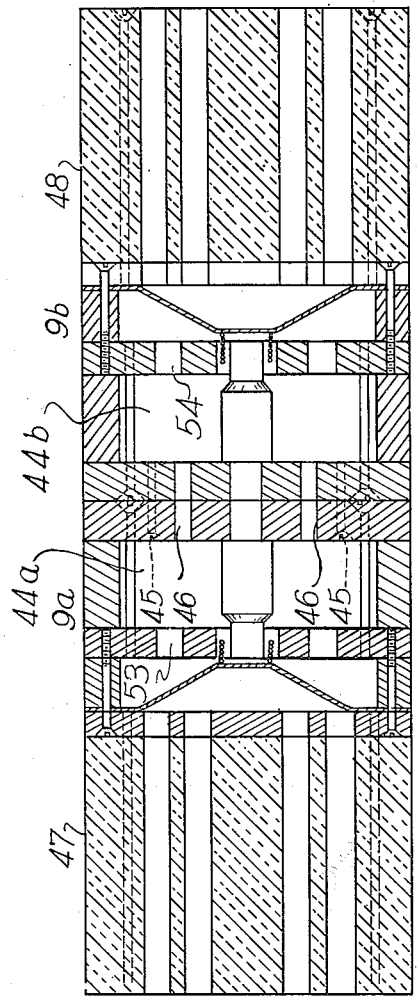
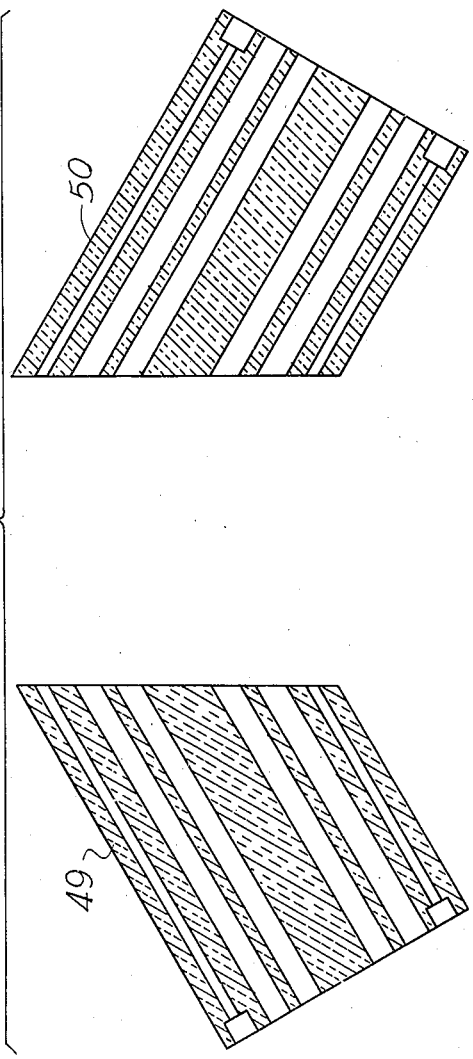
INVENTOR.
Gabriel M. Giannini
BY Davis, Lindsey, Smith & Shonts
Attorneys.

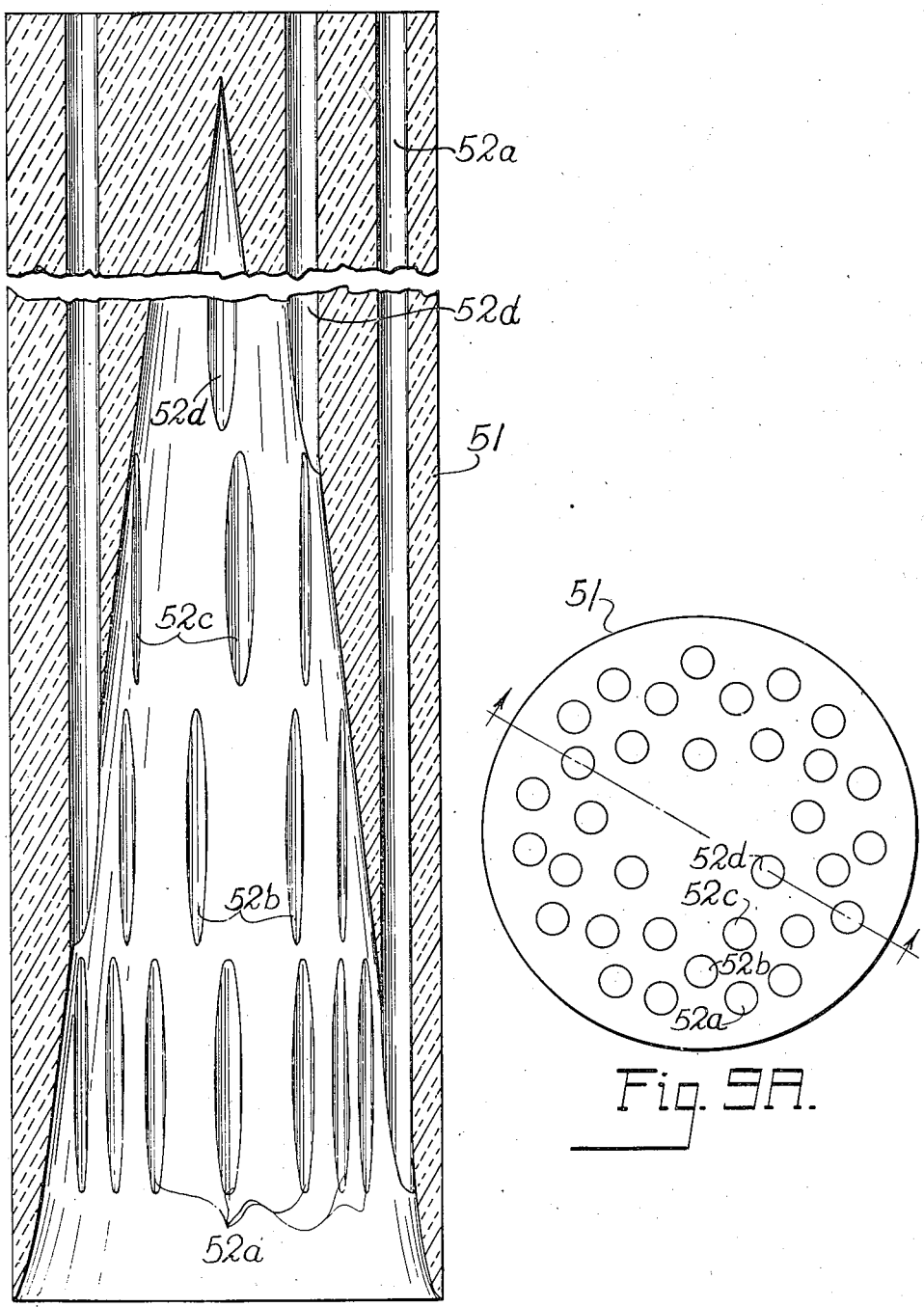

Patented Mar. 8, 1949

2,463,762

UNITED STATES PATENT OFFICE 2,463,762

ELECTROACOUSTICAL TRANSDUCER

Gabriel M. Giannini, North Hollywood, Calif., assignor, by mesne assignments, to Automatic Electric Laboratories, Inc., a corporation of Delaware Application November 14, 1941, Serial No. 419,166

16 Claims. (Cl. 179—116)

The present invention relates to electro-acoustical apparatus and, more particularly, to improvements in microphones and loudspeakers of the directional type which are adapted for use in loudspeaking intercommunication systems.

It is an object of the present invention to provide an improved microphone of simple construction and arrangement which is highly directional in its response at all frequencies within its operating frequency range.

It is another object of the invention to provide an improved microphone of the balanced type, wherein acoustic networks formed of sound absorbing material and provided with passages communicating with both sides of the microphone diaphragm are utilized in order to enhance the directional characteristics of the device.

According to a further object of the invention a part of the structure forming the acoustic network provided on the back side of the microphone diaphragm is disposed within the cavity defined by the parts of the magnetic field structure of the device.

According to still another object of the invention the passages through which sound waves are transmitted to the two sides of the diaphragm are at least in part lined with thin-walled metal tubes, in order to minimize absorption of high frequency sound waves transmitted therethrough.

In accordance with a further object of the invention, the tubular linings for the sound transmission passages are each provided with narrow slits extending lengthwise therealong in order to minimize resonance effects within the passages.

It is another object of the invention to provide an improved microphone of the character described, wherein the acoustical impedance of the chamber formed on the back side of the diaphragm is matched by a chamber of like acoustical impedance on the front side of the diaphragm, through the provision of a dummy field structure having a volume substantially equal to the volume of the chamber on the back side of the diaphragm and a surface configuration facing the front side of the diaphragm which approximates the configuration of the actual field structure facing the back side of the diaphragm.

According to still another object of the invention, the directional characteristics of the microphone particularly at low frequencies, are enhanced by utilizing a moving system having two diaphragms which are acoustically coupled on their back sides through an acoustic network which is designed to pass low frequency sound waves and to attenuate the transmission of high frequency sound waves.

The invention, both as to its organization and method of operation, together with further objects and advantages thereof, will best be understood by reference to the specification taken in connection with the accompanying drawings in which Figs. 1a, 1b and 1c illustrate one embodiment of a microphone constructed and arranged in accordance with the present invention; Figs. 4, 5, 6 and 7 illustrate modified arrangements of improved microphones constructed in accordance with the invention; Figs. 8, 9 and 9A illustrate modified structural arrangement of the acoustic networks which may be used in combination with the various microphone arrangements; and Figs. 2 and 3 are detail views illustrating the thin-walled tubular liners which may be used to line the sound transmission passages included in any one of the acoustic networks shown in Figs. 1 to 9, inclusive.

Referring now more particularly to the drawings, wherein like reference characters are used to identify corresponding parts, and more particularly Figs. 1a, 1b and 1c thereof, the improved microphone arrangement there illustrated comprises a magnetic field structure indicated generally at 10 which supports a moving system including a cone-shaped diaphragm 11 and a moving coil 12. More specifically, the magnetic field structure comprises a permanently magnetized annular ring 13 formed of "Alnico" and magnetized lengthwise along its longitudinal axis, a bottom plate 14, a center pole piece 15 and a top plate 16. The parts 14, 15 and 16 are preferably formed of "Allegheny Electric" metal or other highly permeable magnetic material. The center pole piece 15 is provided with a lower portion 15a of reduced diameter which extends within a centrally disposed opening provided in the lower plate 14. A sweat connection between the side walls of this opening and the sides of the extended pole piece portion 15a may be used in order rigidly to secure the center pole piece to the bottom plate 14. At its upper end, the center pole 15 is provided with a portion 15b of reduced diameter which extends within a centrally disposed opening 16a formed in the top plate 16. The diameter of this opening is slightly larger than the diameter of the upper portion 15b of the pole piece 15, so that an air gap is provided within which the moving coil 12 is free to move. The magnetic circuit assembly is completed by a plurality of assembly screws 17 which extend through openings provided in the bottom plate 14 and are threaded into tapped drill holes provided in the top plate 16. These screws serve rigidly to clamp the annular permanent magnet 13 between the top and bottom plates 16 and 14.

Preferably, the cone-shaped diaphragm 11 is formed of pressed fiber or the like, and the moving coil 12 is cemented to the lower bulbous portion thereof in a position such that it is concentrically disposed within the air gap defined between the parts 15 and 16 of the magnetic field structure. The terminal ends of this coil may be electrically connected to lead-in wires in any desired manner, although preferably connections are made at anchor posts which extend through and are secured to the lower bottom portion of the diaphragm 11. This diaphragm is provided with an outer flat annular ring portion 11a which is utilized in mounting the diaphragm upon the magnetic field structure. More specifically, the diaphragm supporting structure comprises a pair of annular spacing rings 18 and 19 which may be formed of molded "Bakelite" or other non-magnetic material, and assembly screws 20 which extend through registering openings provided in the two rings 18 and 19 and the flat annular edge of the diaphragm 11 and are threaded into tapped drill holes provided in the top plate 16 of the magnetic field structure. It will be understood that with this arrangement the outer peripheral edge of the diaphragm 11 is rigidly clamped between the two rings 18 and 19 so that the stiffness thereof is materially enhanced. Accordingly, low frequency components of sound which reach the diaphragm are prevented from producing any substantial response of the device.

In order to provide a balanced arrangement, i. e., one in which the response of the diaphragm 11 is proportional to the difference in the amplitudes of in-phase components of sound reaching the front and back sides of the diaphragm, and to enhance the directional characteristics of the device, acoustic networks are respectively associated with the front and back sides of the moving system. The network associated with the front side of the diaphragm comprises a body of sound absorbing material 21, which is provided with a number of passages 22 extending longitudinally therethrough for the transmission of sound to the front side of the diaphragm. The cross-sectional configuration of this body conforms to that of the magnetic field structure 10, and the body is secured to the structure which supports the moving system by assembly screws 23 which extend through holes provided in the body 21 and are threaded into tapped drill holes provided in the spacing ring 19.

The acoustic network associated with the back side of the diaphragm 11 comprises a second body 24 of sound absorbing material, which is disposed within the annular cavity defined by the parts 13, 14, 15 and 16 of the magnetic field structure and is provided with elongated passages 25 extending therethrough. The same number of passages 25 are provided through the body 24 as are provided through the body 21. At opposite ends thereof, the passages 25 register with openings 26 and 27 cut through the top and bottom plates 16 and 14, respectively, of the magnetic field structure. The body 24 is constructed completely to fill the cavity within the field structure 10 and is provided with openings extending lengthwise therethrough, which accommodate the assembly screws 17. From the above explanation it will be understood that the registering openings 26 and 27, in combination with the elongated holes 25 extending through the body 24, form sound transmission passages which communicate with the chamber or cavity 18a provided on the back side of the diaphragm 11. The dimensions, i. e., the diameters and lengths of these passages are substantially identical with the dimensions of the passages 22 through the body 21, whereby the two sets of passages are characterized by substantially identical acoustical impedance characteristics.

One of the factors which influences the response of the diaphragm 11 to a sound wave of a particular frequency and amplitude, is the volume of air in the cavity 18a provided on the back side of the diaphragm. In other words, this cavity is possessed of predetermined acoustical impedance characteristics which determine, to an appreciable extent, the response of the diaphragm 11 at certain frequencies within the operating frequency range of the device. This influence on the diaphragm response is primarily manifested in the low frequency end of the audio-frequency range. In order to balance the effect of this chamber as provided on the back side of the diaphragm, a similar chamber 19a of substantially identical volume is provided on the front side of the diaphragm. More specifically, the chamber 19a is formed by providing a downwardly tapering projection 21a on the body 21 of sound absorbing material and by using a spacing ring 19 of the correct thickness. Since both of the chambers 18a and 19a are substantially free from restricted air passages or pockets, the arrangement just described, when properly designed to make the two chambers of substantially identical volume, insures a substantial similitude between the acoustical impedance characteristics thereof. This, in turn, insures that in-phase components of sound waves of like amplitude entering the two sets of sound passages, will produce the same effect on the diaphragm 11, thereby to achieve the desired cancellation thereof. In this regard, it will be understood from the above explanation that when in-phase components of sound of equal amplitudes and originating at the same sound source are transmitted through the passages 22 and 25 respectively to the front and back sides of the diaphragm, the forces acting on the diaphragm cancel each other so that the net response of the diaphragm is not appreciable. This condition arises when a sound source is placed substantially in the median plane which bisects the long axis of the microphone. If the sound source is moved to a point directly in front of the passages 22 provided through the body 21, or directly in front of the openings 27 provided in the bottom plate 14, however, the predominant portion of the sound energy is transmitted either to the front or the back side of the diaphragm 11, as the case may be, whereby a substantial response of the device is produced. When the sound source is located at points between the two extremes just assumed, or in other words the angle of incidence between the sound source and the openings to the two sets of passages is changed, the response of the diaphragm 11 assumes an intermediate value between the maximum value attained when the source is located directly in front of one of the two acoustic networks and the minimum value attained when the source is disposed in the plane which bisects the long axis of the microphone.

As indicated above, the characteristics of the microphone shown in Figs. 1a, 1b and 1c are determined to some extent by the matching of the acoustical impedances of the chambers 18a and 19a provided on the back and front sides of the diaphragm 11, respectively. If a more accurate matching of the acoustical impedances of these chambers is desired, the arrangement illustrated in Fig. 4 of the drawing may be used. In this arrangement a dummy field structure 10a is provided on the front side of the diaphragm 11, having a configuration facing the diaphragm which substantially approximates the configuration of the surfaces of the actual field structure 10 which face the rear side of the diaphragm. More specifically, this dummy field structure comprises an annular ring 13a which is supported between the two plates 16b and 19b. The assembly of the dummy field structure is completed by means of assembly screws 17a which extend through openings provided in the plate 16b and are threaded into holes drilled in the plate 19b. A center pole piece 15c is centrally mounted upon the plate 16b and is provided with a lower end of reduced cross section which extends within an enlarged opening 16d cut through the plate 19b. Thus an air gap between the pole piece portion 15d and the side walls of the opening 16d is provided which approximates in contour and dimensions the effective air gap within which the moving coil 12 is disposed. Moreover, the chamber formed between the lower surface of the plate 19b and the upper side of the diaphragm 11 is of substantially the same volume and has effectively the same configuration as the chamber 18a formed adjacent the back side of the diaphragm. The parts 13a, 16b, 15c and 19b of the dummy field structure 10a may be formed of any desired material which will not magnetically influence the magnetic circuit of the field structure 10. For example, these parts may be formed of molded Bakelite or other insulating material. When these parts are thus formed of a hard non-porous material, the surfaces which are exposed to sound waves reaching the front side of the diaphragm have the same sound reflective and absorbing properties as the surfaces which are exposed to sound waves transmitted to the back side of the diaphragm.

The acoustical networks associated with the front and back sides of the diaphragm are slightly different from the networks associated with the diaphragm of the microphone shown in Figs. 1a, 1b and 1c. More specifically, in the Fig. 4 arrangement, the passages 25 as formed in the body 24 disposed within the cavity of the field structure 10, are matched by providing a body of sound absorbing material 24a which entirely fills the cavity formed within the parts of the dummy field structure 10a and is provided with sound transmission passages 25a therethrough. These passages register with openings 26a and 27a cut through the top and bottom plates 16b and 19b, respectively, of the dummy field structure 10a. If required, the passages 25 and 25a extending through the cavities within the real and dummy field structures 10 and 10a may be extended by providing two additional bodies 21a and 21b also formed of sound absorbing material and having sound transmission passages 22a and 22b cut respectively therethrough. In such case the passages 22a provided in the body 21a are cut to register with the openings 26a provided in the top plate 16b. Similarly, the passages 22b provided in the body 21b are cut to communicate with the openings 27 extending through the bottom plate 14 of the field structure 10. The two bodies 21a and 21b may be mounted upon the plates 16b and 14, respectively, by means of assembly screws 23a and 23b, respectively.

The arrangement illustrated in Fig. 5 of the drawings differs from the two modifications described above, in that the sound transmission passages communicating with the front and back sides of the diaphragm 11 terminate in planes which are disposed substantially at right angles to each other. More particularly, the Fig. 5 arrangement comprises a body of sound absorbing material 30 which is secured to the bottom plate 14 by means of assembly screws 31 and is provided with sound transmission passages 32 extending longitudinally therethrough and registering with the openings 27 in the bottom plate 14. The outer end of the body 30 is cut at an angle of approximately 45 degrees with respect to the longitudinal axis of the body so that the sound transmission passages are of different lengths and terminate in openings located in a plane which faces at approximately a 45 degree angle with respect to the long axis of the microphone. The acoustical network formed by the combination passages 25, 32, 26 and 27 which communicate with the back side of the diaphragm 11, is matched by providing a second body of sound absorbing material 33 which is secured to the ring 19 by means of assembly screws 34 and is provided with sound transmission passages 35 cut longitudinally therethrough and communicating with the front side of the diaphragm 11. The outer end of this body is also cut at a 45 degree angle with respect to its longitudinal axis so that the sound transmission passages 35 are terminated in a plane which is disposed substantially at right angles with respect to the plane of termination of the sound transmission passages 32 through the body 30. The number of passages 35 equals the number of passages 32, and the length and diameter of each passage 35 correspond precisely to that of one combination passage 32, 27, 25 and 26 communicating with the back side of the diaphragm 11. In using the microphone illustrated in Fig. 5 of the drawings as the transmitting element of a substation circuit which forms a part of a loudspeaking intercommunicating system, the device is so disposed with respect to an associated loudspeaker 36 that the plane which is perpendicular to and bisects the long axis of the microphone determines the location of the loudspeaker. More specifically, the loudspeaker 36 is located at some point in this median plane and has its sound transmitting passages facing away from the openings of the passages 32 and 35. With this arrangement, sound waves as reproduced by the loudspeaker 36 may be directed from this speaker substantially toward the user of the apparatus, and the user of the equipment may face either the outer end of the body 30 or the outer end of the body 33 in speaking into the microphone. Thus the microphone is rendered substantially non-responsive to sound produced through operation of the loudspeaker 36, without impairing the response of the device to voice waves transmitted thereto by a person speaking into one end of the device.

The microphone arrangement illustrated in Fig. 6 of the drawings is in all respects identical with that shown in Fig. 5 of the drawings, excepting the acoustical networks provided in association with the front and back sides of the diaphragm 11. In the Fig. 6 arrangement, the acoustical network provided on the back side of the diaphragm is partially formed by the passages 25 through the body 24 of sound absorbing material disposed within the cavity of the magnetic field structure 10. These passages register with elongated openings 37 provided in a body 38 of sound absorbing material which is secured to the bottom plate 14 of the field structure 10 by means of assembly screws 39. The body of sound absorbing material 38 is constructed to extend substantially at right angles with respect to the longitudinal axis of the field structure 10 and the passages 37 extending lengthwise therethrough are accordingly curved around a right angle bend to register with the openings 27 provided in the bottom plate 14. The outer end of the body 38 is cut at an angle which falls away from a plane parallel to the longitudinal axis of the microphone in order to reduce the angle of incidence between the sound transmission openings of the loudspeaker 36 and the outer ends of the passages 37 provided in this body. The acoustical network provided on the front side of the diaphragm 11 to balance that located on the back side of the diaphragm comprises an L-shaped body 40 of sound absorbing material having sound transmission passages 41 extending therethrough. The portions of these passages which extend through the base portion 40a of the body 40 are equal in length to the length of the passages 25 as extended to include the openings 26 and 27 provided in the top and bottom plates 16 and 14 of the magnetic field structure 10. Similarly, the portions of the passages 41 which extend through the long portion 40b of the body 40 and are curved around a right angle bend, correspond in length to the passages 37 formed in the body 38. Thus by making the passages 41 and 37 of the same diameters and by providing a like number of passages in each of the two bodies, the acoustical impedance characteristics of the networks respectively provided on the front and back sides of the diaphragm 11 may be matched. In this regard, it is noted that the outer end of the body 40 is also cut at an angle which falls away from a plane parallel to the longitudinal axis of the field structure 10 in order to reduce sound wave transmission from the loudspeaker 36 into the sound passages 41.

From the above explanation with respect to the modified arrangements illustrated in Figs. 5 and 6 of the drawings, it will be understood that with the loudspeaker 36 in the median plane of any of the illustrated devices, a sound wave generated thereby will normally be transmitted in phase to the openings of the sound passages respectively communicating with the front and back sides of the diaphragm 11, regardless of which type of acoustical network is provided. The sound waves as transmitted through the acoustical networks exert substantially equal and opposite forces upon the diaphragm, so that substantially no movement of the diaphragm is produced. However, if a party speaks directly into the openings of the passages 35 or 32, for example, a greatly predominant force is exerted on one side of the diaphragm to produce a substantial response thereof. It is noted, however, that the microphones will not act uniformly at all frequencies within the operating frequency range. For sound waves having frequencies corresponding to wave lengths longer than the distance between the outer openings of the passages 32 and 35, for example, the directional characteristics of the microphone are primarily due to the cancellation effects previously described, occasioned by two parts of the same sound wave entering the opposite acoustical networks in phase. At such frequencies there is only one plane of zero pickup, i. e., the median plane which bisects and is perpendicular to the longitudinal axis of the microphone and wherein the loudspeaker 36 is disposed. For sound waves having frequencies corresponding to wave lengths less than the spacing between the openings of the passages 32 and 35, for example, there will be several surfaces of interference and zero pickup. For such frequencies, however, the individual directional characteristics of each acoustical network may be made sharp enough to eliminate the possibility of creating zones of zero pickup in front of each individual network.

If desired the individual directional characteristics of the acoustic networks provided on either side of the diaphragm 11 as embodied in the microphone shown in Fig. 1a, for example, may be enhanced by using the network structure shown in Figs. 9 and 9a of the drawings. This structure comprises a body of sound absorbing material 51 having passages 52a, 52b, 52c, 52d, etc. therethrough which are of different lengths. The length of the longest passage should be comparable to the wave length of the lowest frequency sound wave for which the network is to be directional, and the number of long passages must be fairly large if a pronounced directional effect at low frequencies is to be obtained. Accordingly in the nested passage arrangement, the longest passages 52a are located the greatest radial distance from the center of the body 51 and the passages 52b, 52c and 52d of progressively shorter lengths are disposed to form circles of progressively shorter radius.

With the above-described arrangement, when a sound wave progresses in a direction which is toward the openings of the passages 52 and along the axis of the passages, all of the sound reaches the chamber adjacent the diaphragm at the same time regardless of whether it passes through a long passage or a short passage, since, in a good sized passage, the velocity of sound is practically the same as in open air. Thus, under such circumstances, the sound waves are in phase and they combine to exert a reinforcing effect on the diaphragm. When the sound waves are incident in any other direction, they will reach the chamber adjacent the diapragms at different times through the different passages, since the length of the path depends upon the passage which is traversed. Accordingly, the sound waves arriving in the diaphragm chamber through the passages of different lengths are out of phase and no wave reinforcing action takes place. Hence only a small force is exerted on the diaphragm.

Referring now more particularly to Fig. 7 of the drawings, the arrangement there illustrated is also designed to provide directional characteristics which are more nearly uniform over the entire operating frequency range. In this regard, it may be noted that the directivity of any microphone is a function of the ratio between the dimensions of the instrument and the wave length of the sound wave which the instrument is required to handle. The dimensions of the instrument are necessarily constant, whereas the wave length of the sound transmitted to the device must necessarily vary. Accordingly, the directional effects of the microphone vary to a considerable extent with changes in frequency. In the arrangement shown in Fig. 7 of the drawings, two microphone units 9a and 9b are provided which are identical in construction with the microphone illustrated in Figs. 1a, 1b and 1c of the drawings and described above. These microphone units are placed back to back and are secured together by means of assembly screws 45, and the cavities 44a and 44b within the respective field structures of the two units are connected in communicating relationship by means of passages 46 drilled through the adjacent bottom plates of the two field structures. An equal number of larger openings 53 and 54 are provided through the respective top plates of the magnetic field structures in the two units so that a large amount of acoustical coupling is provided between the cavities 44a and 44b and the back sides of the respective associated diaphragms. Acoustic networks 47 and 48, each comprising a body of sound absorbing material having sound transmission passages extending longitudinally therethrough, are provided on the front sides of the diaphragms respectively included in the two microphone units 9a and 9b, in order to enhance the directional characteristics of the device. These passages are of identical dimensions so that the acoustical networks respectively facing the two diaphragms are possessed of identical acoustical impedance characteristics. In the operation of this device the openings 46 communicating between the two cavities 44a and 44b serve to provide acoustical coupling between the two diaphragms over the lower portion of the operating frequency range. By virtue of this coupling, the two diaphragms operate as a single diaphragm structure in response to sound waves transmitted thereto and having frequencies within the indicated lower portion of the operating range. By properly proportioning the dimensions of the passages 46, and more particularly the cross-sectional area thereof, the acoustical impedance between the two connected chambers 44a and 44b may be made to increase sharply with increasing sound frequencies, so that at a particular point in the operating frequency range the two diaphragms are effectively decoupled and may operate as independent units at all higher frequencies. Thus it will be apparent that over the lower portion of the operating frequency range an effective cancellation of the portions of a sound wave transmitted through the two acoustical bodies 47 and 48 may be obtained through the action of the sound wave components upon the diaphragms of the two units 9a and 9b. At higher frequencies, however, these diaphragms are acoustically decoupled and hence are free to operate independently of each other. Accordingly, if the directional characteristics of the two bodies 47 and 48 are made such that no high frequency sound will reach both diaphragms simultaneously, a device of uniform directivity is obtained at all frequencies within the operating frequency range.

If desired, the two bodies 49 and 50, illustrated in Fig. 8 of the drawings, may be used in conjunction with the compound microphone arrangement of Fig. 7, in order to adapt the device for desk mounting. The two bodies 49 and 50 are identical with the bodies 47 and 48, respectively, except that they are constructed and arranged to be mounted so that they extend at an angle with respect to the longitudinal axis of the compound microphone unit, whereby the openings of the passages extending therethrough are disposed at an acute angle with respect to each other.

The various bodies of sound absorbing material utilized in conjunction with the several modifications of the microphone as described above are, preferably, preformed to the desired shape in accordance with the method described and claimed in co-pending application Serial No. 467,695, filed December 3, 1942, Giannini. In brief, the method there disclosed comprises mixing a loose insulating material of the rock wool type with a cement binder, and molding the mixture into a solid block of the desired shape before drying of the binder starts. The molded block obtained after the binder is fully set is somewhat porous and will still transmit air through some of its surfaces. Accordingly, the outer surface of each molded block is painted with one or more coats of lacquer to minimize sound transmission therethrough. It has been found that the number of coats of lacquer, and more particularly the thickness of the lacquer layer on the outside surfaces of a molded block, determines to some extent the acoustical permeability of the structure. Hence, by appropriately controlling the depth of the lacquer layer, the acoustical characteristics of the microphone in which the blocks are used may be partially controlled.

One of the advantages of utilizing acoustical networks on the front and back sides of the microphone diaphragm which are formed of sound absorbing material, lies in the increased directivity of the device. Thus, if conventional metal tubular members are used in the construction of the sound transmission passages, the members have a tendency to resonate at given frequencies, with a corresponding increase in the response of the device at such frequencies. Also, if the walls of the tubular passages are made of a good sound conducting material, such as metal, and are capable of vibrating as a whole, they will not only pick up sound from the front opening but also through the walls. It has been found that the sounds which produce the greatest undesired response of the metal tubular members as used in conventional directional arrangements, are those sounds which correspond to the natural frequency of a particular tube under consideration, and which strike the walls of the tube broadside. Such sound waves may destroy to a large extent the directional characteristics of a device which includes sound directing tubes constructed of metal or other sound conductive material. Since, however, in the various modifications of the illustrated microphone the walls defining the tubular sound transmission passages are of sound absorbing material and are substantially non-permeable when constructed in accordance with the method briefly outlined above, sound waves can only be transmitted through the passages by way of the open ends thereof. One difficulty with the illustrated structure pertains to the absorption of high frequency sounds by the sound absorbing walls defining the sound transmission passages. This absorption has the effect of attenuating high frequency sound waves transmitted through the passages and, hence, an ultimate effect of reducing the response of the device in the high frequency end of the operating frequency range. In order to obviate this difficulty, each of the sound transmission passages may be lined with a thin-walled metal tubular member in the manner illustrated in Figs. 2 and 3 of the drawings. As there shown, one of the sound transmission passages through the body 21 of sound absorbing material is lined with a small thin-walled tube 51 having a narrow slit 52 extending longitudinally therealong throughout its length. The purpose of providing this slit is to minimize any tendency for the tube 51 to resonate and thus produce distortion of the microphone output. It will be understood that when the arrangement of Figs. 2 and 3 is used, all of the advantages of using acoustical bodies formed of sound insulating material in the construction of the sound transmission passages are retained without the attendant objection of absorption of the high frequency sound energy.

While several embodiments of the invention have been described, it will be understood that various modifications may be made therein without departing from the true spirit and scope of the invention.

What is claimed is:

1. A microphone comprising assembled field elements providing a magnetic circuit and defining a cavity therebetween, a moving system including a diaphragm, and means including a molded block of sound absorbing material disposed within said cavity and having sound transmission passages formed therethrough for transmitting sound waves to one side of said diaphragm.

2. A microphone comprising a field structure which includes a pair of plates and an annular permanent magnet mounted between said plates, whereby a cavity is formed within said structure, a moving system mounted upon one of said plates and including a diaphragm, and a molded block of sound absorbing material disposed within said cavity, said plates and said block having communicating openings formed therethrough which function to transmit sound waves to one side of said diaphragm.

3. A balanced microphone comprising a moving system which includes a diaphragm, a field structure supporting said moving system and provided with parts defining a first cavity on one side of said diaphragm, a dummy field structure provided with parts defining a second cavity on the other side of said diaphragm which has acoustical impedance characteristics approximating those of said first cavity, certain of the parts of said field structures being provided with sound transmission passages therethrough which communicate with said cavities, and two molded blocks of sound absorbing material respectively disposed in said cavities and having sound transmission passages formed therethrough which respectively communicate with the passages through the parts of said field structures.

4. A balanced microphone comprising a moving system which includes two diaphragms each having a front side and a back side, sound transmission structures of sound absorbing material respectively associated with the front sides of said diaphragms and each including elongated passages communicating with the associated diaphragm to render the associated diaphragm only directionally responsive to sound produced in the vicinity of said microphone, and an acoustical network interposed between the back sides of said diaphragms, including restricted passages therebetween, to provide acoustical coupling therebetween only at frequencies within the low frequency band of the operating frequency range of said microphone.

5. A balanced microphone comprising two substantially identical microphone units having magnetic field structures connected back to back and diaphragms facing away from each other, said field structures including parts respectively defining cavities on the back sides of their respective associated diaphragms, the adjacent parts of said field structures being provided with passages therethrough which connect said cavities.

6. A balanced microphone comprising two substantially identical microphone units having magnetic field structures connected back to back and diaphragms facing away from each other, said field structures including parts respectively defining cavities on the back sides of their respective associated diaphragms, the adjacent parts of said field sturctures being provided with passages therethrough which connect said cavities, the dimensions of said cavities and said passages being so proportioned that acoustical coupling through said cavities and passages between said diaphragms occurs only at frequencies within the low frequency band of the operating frequency range of said microphone.

7. A balanced microphone comprising two substantially identical microphone units having magnetic field structures connected back to back and diaphragms facing away from each other, said field structures including parts respectively defining cavities on the back sides of their respective associated diaphragms, the adjacent parts of said field structures being provided with passages therethrough which connect said cavities, and acoustical networks disposed adjacent the front sides of said diaphragms to render said microphone directionally responsive to sound waves transmitted thereto.

8. A balanced microphone comprising two substantially identical microphone units having magnetic field structures connected back to back and diaphragms facing away from each other, said field structures including parts respectively defining cavities on the back sides of their respective associated diaphragms, the adjacent parts of said field structures being provided with passages therethrough which connect said cavities, the dimensions of said cavities and said passages being so proportioned that acoustical coupling through said cavities and passages effectively occurs only at frequencies within the low frequency band of the operating frequency range of said microphone, and acoustical networks disposed adjacent the front sides of said diaphragms to render said microphone directionally responsive to sound waves transmitted thereto.

9. In combination with a sound translating device including a movable diaphragm, a structure of sound absorbing material provided with a number of passages therethrough which communicate with said diaphragm, and thin metal tubes lining the walls of at least a portion of said passages, said sound absorbing material reducing resonance effects in said passages and reducing reflection of sound waves in that portion of said passages not lined with said tubes.

10. In combination with a sound translating device including a movable diaphragm, a structure of sound absorbing material provided with a number of passages therethrough which communicate with said diaphragm, and thin metal tubes lining the walls of at least a portion of said passages, each of said tubes having a narrow slot extending along the length thereof, said material and said slotted tubes reducing distortional operation of said device by minimizing resonance effects in said passages and tubes.

11. In combination with a sound translating device including a movable diaphragm, a structure of sound absorbing material provided with a number of passages therethrough which communicate with said diaphragm, said material reducing resonance effects and reflection of sound waves in said passages, said passages being of different lengths and the passages of greatest length being disposed the greatest distance from the longitudinal axis of said structure, whereby said passages of greater length cause the low frequency sound waves to communicate with the outside edge portion of said diaphragm, and the progressively shorter passages cause correspondingly high frequency sound waves to communicate with said diaphragm at points having progressively shorter radii from the center of said diaphragm.

12. In a microphone, vibrating means, electrical means responsive to said vibrating means for transmitting a signal, and means arranged to permit ambient sound waves to impinge upon said vibrating means at spaced points substantially in phase and in substantially equal amplitude so that they oppose and substantially cancel out their combined effect.

13. A microphone comprising vibrating means, means for housing said vibrating means, said housing means having a pair of openings in complementary relation to said vibrating means for passage of sound waves to impress said waves on said vibrating means at spaced points in substantially identical phase and amplitude, and electrical means responsive to said vibrating means for transmitting a signal only when sound waves are emitted in close spaced relation to and directed at one opening.

14. A microphone having a casing, and a diaphragm in said casing, said casing having a pair of openings in complementary relation to said diaphragm for exposing the opposite faces of said diaphragm to equal counterbalancing impact by ambient sounds originating at a distance from said microphone.

15. A microphone comprising housing means including two complementary independent chambers each having an opening, vibrating means having spaced portions each exposed at one chamber, and electrical means responsive to said vibrating means, said openings being close spaced and arranged in complementary relation to said vibrating portions, said electrical means being actuable to transmit a signal only upon unbalanced reception of sound in said chambers.

16. A microphone comprising a housing, a vibrating membrane mounted substantially centrally in said housing, and electrical means associated with and responsive to vibrations of said membrane, said housing having a pair of close spaced divergently facing similar openings therein on opposite sides of and in complementary relation to said membrane.

GABRIEL M. GIANNINI.

REFERENCES CITED

The following references are of record in the file of this patent:

UNITED STATES PATENTS

| Number | Name | Date |
|---|---|---|
| 1,689,788 | Larsen | Oct. 30, 1928 |
| 1,707,544 | Thuras | Apr. 2, 1929 |
| 1,777,118 | Harrison | Sept. 30, 1930 |
| 1,992,300 | Fonges | Feb. 26, 1935 |
| 2,086,834 | Willans | July 12, 1937 |
| 2,172,871 | Giannini | Sept. 12, 1939 |
| 2,184,727 | Willans | Dec. 26, 1939 |
| 2,193,398 | Fisher | Mar. 12, 1940 |
| 2,196,342 | Ruttenberg | Apr. 9, 1940 |
| 2,225,312 | Mason | Dec. 17, 1940 |
| 2,228,886 | Olson | Jan. 14, 1941 |
| 2,247,663 | Olson | July 1, 1941 |
| 2,252,846 | Giannini et al. | Aug. 19, 1941 |
| 2,299,620 | Giannini | Oct. 20, 1942 |

FOREIGN PATENTS

| Number | Country | Date |
|---|---|---|
| 579,614 | France | Aug. 7, 1924 |
| 623,543 | France | Mar. 21, 1927 |
| 318,279 | Great Britain | Sept. 2, 1929 |